United States Patent
Brunella et al.

(10) Patent No.: US 12,544,325 B2
(45) Date of Patent: Feb. 10, 2026

(54) COMPOSITIONS AND RELATED METHODS

(71) Applicant: Colgate-Palmolive Company, New York, NY (US)

(72) Inventors: Andre Brunella, Dornach (CH); Turan Matur, Binningen (CH)

(73) Assignee: Colgate-Palmolive Company, New York, NY (US)

( * ) Notice: Subject to any disclaimer, the term of this patent is extended or adjusted under 35 U.S.C. 154(b) by 853 days.

(21) Appl. No.: 17/627,852

(22) PCT Filed: Dec. 17, 2021

(86) PCT No.: PCT/US2021/064052
§ 371 (c)(1),
(2) Date: Jan. 18, 2022

(87) PCT Pub. No.: WO2022/133226
PCT Pub. Date: Jun. 23, 2022

(65) Prior Publication Data
US 2023/0338264 A1     Oct. 26, 2023

Related U.S. Application Data

(60) Provisional application No. 63/127,788, filed on Dec. 18, 2020.

(51) Int. Cl.
*A61K 8/69* (2006.01)
*A61K 8/20* (2006.01)
*A61Q 11/00* (2006.01)

(52) U.S. Cl.
CPC .................. *A61K 8/69* (2013.01); *A61K 8/20* (2013.01); *A61Q 11/00* (2013.01); *A61K 2800/805* (2013.01); *A61K 2800/92* (2013.01)

(58) Field of Classification Search
None
See application file for complete search history.

(56) References Cited

U.S. PATENT DOCUMENTS

| | | |
|---|---|---|
| 3,535,421 A | 10/1970 | Briner et al. |
| 3,678,154 A | 7/1972 | Widder et al. |
| 4,842,847 A | 6/1989 | Amjad |
| 4,866,161 A | 9/1989 | Sikes et al. |
| 4,885,155 A | 12/1989 | Parran, Jr. et al. |
| 6,464,962 B2 * | 10/2002 | Heckendorn .......... A61Q 11/00 424/49 |
| 2005/0226822 A1 | 10/2005 | Garbers et al. |
| 2008/0171268 A1 | 7/2008 | Yazami |
| 2013/0209375 A1 | 8/2013 | Moya Argilagos et al. |
| 2018/0125769 A1* | 5/2018 | Poth .................. A61K 8/24 |
| 2019/0307657 A1 | 10/2019 | Wenk et al. |
| 2020/0306159 A1 | 10/2020 | Xu et al. |

FOREIGN PATENT DOCUMENTS

| | | | |
|---|---|---|---|
| EP | 2934689 B1 * | 9/2017 | ............. A61Q 11/00 |
| JP | H07126230 | 5/1995 | |
| KR | 102022364 | 9/2019 | |
| WO | 2009/130319 | 10/2009 | |
| WO | 2018/145966 | 8/2018 | |
| WO | WO-2018145966 A1 * | 8/2018 | ............... A61K 8/21 |

OTHER PUBLICATIONS

Gabriel Grundl, Martina Müller, Didier Touraud, Werner Kunz, Salting-out and salting-in effects of organic compounds and applications of the salting-out effect of Pentasodium phytate in different extraction processes, Journal of Molecular Liquids, vol. 236 https://doi.org/10.1016/j.molliq.2 (Year: 2017).*

International Search Report and the Written Opinion of the International Searching Authority issued in International Application PCT/US2021/064052 mailed Apr. 7, 2022.

Intensive Mouthwash [retrieved from internet on Jul. 31, 2024] <URL: https://www.gnpd.com/sinatra/recordpage/1271136>published Feb. 2010 as per Product Details.

Meridol Dentrifice [retrieved from internet on Jul. 31, 2024] <URL:https://www.gnpd.com/sinatra/recordpage/12965> published Oct. 1999 as per Product Details.

Deng, Sulu, Organic Chemistry, Chemical Industry Press, published Apr. 30, 1999, pp. 150.

* cited by examiner

*Primary Examiner* — Frederick F Krass
*Assistant Examiner* — Ashlee E Wertz

(57) ABSTRACT

The present disclosure relates to amine hydrofluorides and mixtures of these amine hydrofluorides, and to a process for the preparation of these amine hydrofluorides and their use in oral hygiene compositions.

18 Claims, No Drawings

COMPOSITIONS AND RELATED METHODS

FIELD

The present invention relates to compositions containing tertiary amines, and related a process for the preparation of amine hydrofluorides and their use in said compositions.

BACKGROUND

It is known that oral hygiene compositions, by their cleaning action, make a contribution to the hygiene of the oral cavity and thus to the preservation of the health of teeth and gums. The cleaning action of these oral hygiene compositions is customarily supplemented by admixture of active compounds which prevent or control pathological symptoms in the oral cavity, in particular also the formation of bacterial films on the teeth (plaque). These films consist of polysaccharides, primarily of dextrans. In addition to the low-molecular weight sugars, these polysaccharides form a source of nutrition for the plaque bacteria (mainly streptococci and lactobacillaceae). The plaque bacteria gradually break down the polysaccharides to form acidic degradation products (e.g., pyruvic acid, lactic acid, etc.). The pH decrease resulting therefrom brings about the degradation of the tooth enamel known as caries.

It has therefore already been attempted to take steps against the formation of pathological symptoms in the oral cavity using various oral hygiene compositions (e.g., toothpastes, rinsing solutions or dental gels). Active compounds already known the prior art include N-octadeca-9-enylamine hydrofluoride (international non-proprietary name "dectaflur") and N'-octadecyl-N,N,N-tris(2-hydroxyethyl)-1,3-propanediamine dihydrofluoride (international non-proprietary name "olaflur"). On oral use of the hygiene composition, these active compounds form a thin hydrophobic film on the tooth enamel, the amine hydrofluoride groups coming into contact with the tooth enamel. Thus, on the one hand the tooth enamel becomes more resistant to acid attacks on account of the $CaF_2$ covering layer formed, on the other hand the long-chain hydrocarbon residues form a hydrophobic layer which prevents the formation of deposits and the attack of the acidic degradation products on the tooth enamel.

However, while such compounds are effective when used in oral care compositions, their use can be costly due to limiting physical characteristics. For example, olaflur is has very low aqueous solubility. Thus, production and transport of the compound requires high amounts of solution to carry relatively small amounts of the active agent, which results in high handling costs. It would therefore be beneficial to increase the solubility of tertiary amines for production and transport.

BRIEF SUMMARY

The production of compositions containing amine fluorides such as N'-octadecyl-N,N,N-tris(2-hydroxyethyl)-1,3-propanediamine dihydrofluoride (olaflur), ordinarily involves dissolution of solid amine fluoride in water to create an amine fluoride stock solution. This stock solution can then be used directly in the formulation of a composition that contains amine fluoride (e.g., olaflur). However, this stock solution contains only a moderate concentration of amine fluoride, which can only be marginally further increased under ordinary circumstances. Attempts to increase the concentration of amine fluoride beyond this point leads to incomplete dissolution, precipitate formation, or conversion of the solution into a gel-like structure, each of which is undesirable and not useful in standardized production processes.

The inventors have surprisingly found that significantly higher concentrations of amine fluoride and/or tertiary amines can be dissolved in water when alkali salts are added to the solution. The solubility of amine fluoride and/or its non hydrofluoride salt counterpart (referred to as "tertiary amine") in water can be raised by at least 45% when an alkali salt (e.g., sodium chloride) is added to the stock solution. It is believed that this property will lead to proportional savings in transportation costs of the active agent (i.e., the tertiary amine), and also streamline the synthesis of such tertiary amines (e.g., amine fluoride) as well as compositions containing said tertiary amines.

Thus, in a first aspect, the present disclosure is directed to an oral care composition comprising a tertiary amine (e.g., amine fluoride) and an alkali salt in an amount sufficient to increase the solubility of the tertiary amine. In various embodiments, the tertiary amine is a tertiary polyamine or an amine fluoride (e.g., olaflur or decaflur) and the alkali salt is sodium chloride.

In a second aspect, the present disclosure is directed to a method of manufacturing an oral care composition, which includes the steps of mixing a tertiary amine (e.g., amine fluoride) in water; and increasing the solubility of the tertiary amine via the addition of an alkali salt. In various embodiments, the step of mixing a tertiary amine in water further includes mixing a pH adjuster and a fluoride source. In some embodiments, the tertiary amine is a tertiary polyamine or an amine fluoride (e.g., olaflur or decaflur) and the alkali salt is sodium chloride.

DETAILED DESCRIPTION

As used herein, the term "oral composition" means the total composition that is delivered to the oral surfaces. The composition is further defined as a product which, during the normal course of usage, is not, the purposes of systemic administration of particular therapeutic agents, intentionally swallowed but is rather retained in the oral cavity for a time sufficient to contact substantially all of the dental surfaces and/or oral tissues for the purposes of oral activity. Examples of such compositions include, but are not limited to, toothpaste or a dentifrice, a mouthwash or a mouth rinse, a topical oral gel, a denture cleanser, sprays, and the like.

As used herein, the term "dentifrice" means paste, gel, or liquid formulations unless otherwise specified. The dentifrice composition can be in any desired form such as deep striped, surface striped, multi-layered, having the gel surrounding the paste, or any combination thereof. Alternatively, the oral composition may be dual phase dispensed from a separated compartment dispenser.

Compositions of the Present Disclosure

In one aspect the invention is an intermediate composition (Composition 1) for the formulation of an oral care or personal care composition, wherein the composition comprises a tertiary amine (e.g., a tertiary polyamine) and an alkali salt in an amount sufficient to increase the solubility of the tertiary amine. For example, the invention contemplates any of the following compositions (unless otherwise indicated, values are given as percentage of the overall weight of the composition):

1.1 Composition 1, wherein the tertiary amine comprises a tertiary polyamine or an amine fluoride.
1.2 Any of the preceding compositions, wherein the tertiary amine comprises one or more of N'-octadecyltrimethylendiamine-N,N,N'-tris(2-ethanol), N'-octadecyltrimethylendiamine-N,N,N'-tris(2-ethanol)-dihydrofluoride (olaflur),N-octadeca-9-enylamine hydrofluoride (dectaflur), and/or N-octadeca-9-enylamine.
1.3 Any of the preceding compositions, wherein the tertiary amine is a tertiary polyamine.
1.4 Any of the preceding compositions, wherein the tertiary amine comprises at least one of N'-octadecyltrimethylendiamine-N,N,N'-tris(2-ethanol) and N-octadeca-9-enylamine.
1.5 Any of the preceding compositions, wherein the tertiary amine comprises or consists of N'-octadecyltrimethylendiamine-N,N,N'-tri s(2-ethanol).
1.6 Any of the preceding compositions, wherein the tertiary amine comprises an amine fluoride (e.g., octadecyltrimethylendiamine-N,N,N'-tris(2-ethanol)-dihydrofluoride N-octadeca-9-enylamine hydrofluoride).
1.7 Any of the preceding compositions, wherein the tertiary amine is present in an amount of about 10 wt. % to about 80 wt. %, based on the total weight of the composition.
1.8 Any of the preceding compositions, wherein the tertiary amine is present in an amount of about 20 wt. % to about 70 wt. %, based on the total weight of the composition.
1.9 Any of the preceding compositions, wherein the tertiary amine is present in an amount of about 20 wt. % to about 40 wt. %, based on the total weight of the composition.
1.10 Any of the preceding compositions, wherein the tertiary amine is present in an amount of about 25 wt. % to about 35 wt. %, based on the total weight of the composition.
1.11 Any of the preceding composition, wherein the alkali salt is an alkali halide and/or an alkali salt of an organic acid.
1.12 Any of the preceding composition, wherein the alkali salt is an alkali halide.
1.13 Any of the preceding composition, wherein the alkali salt is a sodium or potassium halide.
1.14 Any of the preceding compositions, wherein the alkali salt is sodium chloride or potassium chloride.
1.15 Any of the preceding compositions, wherein the alkali salt is sodium chloride.
1.16 Any of the preceding compositions, wherein the alkali salt is an alkali salt of an organic acid.
1.17 Any of the preceding compositions, wherein the alkali salt is trisodium citrate.
1.18 Any of the preceding compositions, wherein the alkali salt is trisodium citrate dihydrate.
1.19 Any of the preceding compositions, wherein the alkali salt is present in an amount of about 0.01 wt. % to about 15 wt. %, based on the total weight of the composition.
1.20 Any of the preceding compositions, wherein the alkali salt is present in an amount of about 0.05 wt. % to about 5 wt. %, based on the total weight of the composition.
1.21 Any of the preceding compositions, wherein the alkali salt is present in an amount of about 1 wt. % to about 2.5 wt. %, based on the total weight of the composition.
1.22 Any of the preceding compositions, wherein the alkali salt comprises or consists of sodium chloride present in an amount of about 1.0 wt. % to about 2.0 wt. %, based on the total weight of the composition.
1.23 Any of the preceding compositions, wherein the alkali salt comprises or consists of potassium chloride present in an amount of about 1.0 wt. % to about 2.5 wt. %, .e.g., about 1.0 wt. % to about 2.0 wt. %, based on the total weight of the composition.
1.24 Any of the preceding compositions, wherein the alkali salt comprises or consists of trisodium citrate dihydride present in an amount of about 1.0 wt. % to about 4.0 wt. %, e.g., about 1.0 wt. % to about 3.5 wt. %, based on the total weight of the composition.
1.25 Any of the preceding compositions, wherein the composition is an aqueous solution.
1.26 Any of the preceding compositions, further comprising an organic acid.
1.27 Any of the preceding compositions, further comprising an aliphatic di- or tri-carboxylic acid in free or salt form in an amount of about 1 wt. % to about 10 wt. %, based on the total weight of the composition.
1.28 The preceding composition, wherein the aliphatic di- or tri-carboxylic acid is malic acid.
1.29 Any of the preceding compositions, further comprising an organic acid selected from lactic acid, citric acid, tartaric acid and fumaric acid.
1.30 Any of the preceding compositions, further comprising an inorganic acid.
1.31 Any of the preceding compositions, further comprising hydrochloric acid.
1.32 Any of the preceding compositions, further comprising hydrochloric acid in an amount of about 1 wt. % to about 10 wt. %, based on the total weight of the composition.
1.33 Any of the preceding compositions, wherein the composition is a stock solution.
1.34 Any of the preceding compositions, wherein the composition is a stock solution used to create an oral care composition containing an amine fluoride.
1.35 Any of the preceding compositions, wherein the composition is a stock solution used to create a personal care composition containing an amine fluoride.
1.36 Any of the preceding compositions, further comprising a stannous ion source.
1.37 The preceding composition, wherein the stannous source is selected from the group comprising stannous fluoride, stannous chloride, stannic fluoride, stannic chloride, stannic acetate, stannous acetate and combinations thereof.
1.38 Either of the two preceding compositions, wherein the stannous ion source is present in an amount of about 0.01 wt. % to about 0.10 wt. %, based on the total weight of the composition.
1.39 Any of the preceding compositions further comprising a fluoride source selected from: sodium fluoride, potassium fluoride, sodium monofluorophosphate, sodium fluorosilicate, ammonium fluorosilicate, ammonium fluoride, titanium fluoride, hexafluorosulfate, and combinations thereof.
1.40 The preceding composition wherein the fluoride source is present in an amount of 0.1 wt. % to 7 wt. % (e.g., about 3 wt. % to about 6 wt. %) of the total composition weight.
1.41 Any of the preceding compositions wherein the total fluoride content of the composition is in an amount of from 50 to 25,000 ppm (e.g., 750-7000 ppm, e.g., 1000-5500 ppm, e.g., about 500 ppm, 1000 ppm, 1100 ppm, 2800 ppm, 5000 ppm, or 25000 ppm).

1.42 Any of the preceding compositions, further comprising polyvinyl pyrrolidine in an amount of about 2.20 wt. % to about 3.00 wt. %, based on the total weight of the composition.

1.43 Any of the preceding compositions, further comprising a basic amino acid (e.g., arginine) present in an amount corresponding to 1% to 15%, e.g., 3 wt. % to 10 wt. % of the total composition weight, about e.g., 1.5%, 4%, 5%, or 8%, wherein the weight of the basic amino acid is calculated as free form.

1.44 Any of preceding compositions wherein the composition is ethanol-free.

1.45 Any of the preceding compositions wherein the pH is between 4.0 and 10.0, e.g., 5.0 to 8.0, e.g., 7.0 to 8.0.

1.46 Any of the preceding compositions, further comprising calcium carbonate.

1.47 The preceding composition, wherein the calcium carbonate is a precipitated calcium carbonate high absorption (e.g., 20% to 30% by weight of the composition) (e.g., 25% precipitated calcium carbonate high absorption).

1.48 Any of the preceding compositions, further comprising a precipitated calcium carbonate—light (e.g., about 10% precipitated calcium carbonate—light) (e.g., about 10% natural calcium carbonate).

1.49 Any of the preceding compositions, further comprising an effective amount of one or more alkali phosphate salts, e.g., sodium, potassium or calcium salts, e.g., selected from alkali dibasic phosphate and alkali pyrophosphate salts, e.g., alkali phosphate salts selected from sodium phosphate dibasic, potassium phosphate dibasic, dicalcium phosphate dihydrate, calcium pyrophosphate, tetrasodium pyrophosphate, tetrapotassium pyrophosphate, sodium tripolyphosphate, disodium hydrogenorthophoshpate, monosodium phosphate, pentapotassium triphosphate and mixtures of any of two or more of these, e.g., in an amount of 0.01-20%, e.g., 0.1-8%, e.g., e.g., 0.1 to 5%, e.g., 0.3 to 2%, e.g., 0.3 to 1%, e.g., about 0.01%, about 0.1%, about 0.5%, about 1%, about 2%, about 5%, about 6%, by weight of the composition.

1.50 The preceding composition, wherein the polyphosphate is tetrasodium pyrophosphate.

1.51 The preceding composition, wherein the tetrasodium pyrophosphate is from 0.1-1.0 wt. % (e.g., about 0.5 wt. %).

1.52 Any of the preceding compositions, further comprising an abrasive or particulate (e.g., silica).

1.53 Any of the preceding compositions, further comprising a nonionic surfactant, wherein the nonionic surfactant is in an amount of from 0.5-5%, e.g., 1-2%, selected from poloxamers (e.g., poloxamer 407), polysorbates (e.g., polysorbate 20), polyoxyl hydrogenated castor oil (e.g., polyoxyl 40 hydrogenated castor oil), and mixtures thereof.

1.54 The preceding composition, wherein the poloxamer nonionic surfactant has a polyoxypropylene molecular mass of from 3000 to 5000 g/mol and a polyoxyethylene content of from 60 to 80 mol %, e.g., the poloxamer nonionic surfactant comprises poloxamer 407.

1.55 Any of the preceding compositions, further comprising sorbitol, wherein the sorbitol is in a total amount of 10-40% (e.g., about 23%).

1.56 Any of the preceding compositions, further comprising a zinc ion source selected from zinc oxide, zinc citrate, zinc lactate, zinc phosphate and combinations thereof.

1.57 Any of the preceding compositions, further comprising a zinc ion source comprising or consisting of a combination of zinc oxide and zinc citrate.

1.58 The preceding composition, wherein the ratio of the amount of zinc oxide (e.g., wt. %) to zinc citrate (e.g., wt. %) is from 1.5:1 to 4.5:1 (e.g., 2:1, 2.5:1, 3:1, 3.5:1, or 4:1).

1.59 Either of the two preceding compositions, wherein the zinc citrate is in an amount of from 0.25 to 1.0 wt. % (e.g., 0.5 wt. %) and zinc oxide may be present in an amount of from 0.75 to 1.25 wt. % (e.g., 1.0 wt. %) based on the weight of the oral care composition.

1.60 Any of the preceding compositions, comprising zinc citrate in an amount of about 0.5 wt. %.

1.61 Any of the preceding compositions, comprising zinc oxide in an amount of about 1.0 wt. %.

1.62 Any of the preceding compositions further comprising an additional ingredient selected from: benzyl alcohol, Methylisothizolinone ("MIT"), Sodium bicarbonate, sodium methyl cocoyl taurate (tauranol), lauryl alcohol, and polyphosphate.

1.63 Any of the preceding compositions, further comprising a flavoring, fragrance and/or coloring agent.

1.64 Any of the preceding compositions, wherein the composition further comprises a copolymer.

1.65 The preceding composition, wherein the copolymer is a PVM/MA copolymer.

1.66 The preceding composition, wherein the PVM/MA copolymer comprises a 1:4 to 4:1 copolymer of maleic anhydride or acid with a further polymerizable ethylenically unsaturated monomer; for example, 1:4 to 4:1, e.g. about 1:1.

1.67 The preceding composition, wherein the further polymerizable ethylenically unsaturated monomer comprises methyl vinyl ether (methoxyethylene).

1.68 Any of compositions 1.50-1.52, wherein the PVM/MA copolymer comprises a copolymer of methyl vinyl ether/maleic anhydride, wherein the anhydride is hydrolyzed following copolymerization to provide the corresponding acid.

1.69 Any of compositions 1.50-1.53, wherein the PVM/MA copolymer comprises a GANTREZ® polymer (e.g., GANTREZ® S-97 polymer).

1.70 Any of the preceding compositions, further comprising a thickening agent selected from the group consisting of carboxyvinyl polymers, carrageenan, xanthan, hydroxyethyl cellulose and water-soluble salts of cellulose ethers (e.g., sodium carboxymethyl cellulose and sodium carboxymethyl hydroxyethyl cellulose).

1.71 Any of the preceding compositions, further comprising an additional antibacterial agent selected from halogenated diphenyl ether (e.g. triclosan), herbal extracts and essential oils (e.g., rosemary extract, tea extract, magnolia extract, thymol, menthol, eucalyptol, geraniol, carvacrol, citral, honokiol, catechol, methyl salicylate, epigallocatechin gallate, epigallocatechin, gallic acid, miswak extract, sea-buckthorn extract), bisguanide antiseptics (e.g., chlorhexidine, alexidine or octenidine), quaternary ammonium compounds (e.g., cetylpyridinium chloride (CPC), benzalkonium chloride, tetradecylpyridinium chloride (TPC), N-tetradecyl-4-ethylpyridinium chloride (TDEPC), phenolic antiseptics, hexetidine, octenidine, sanguinarine, povidone iodine, delmopinol, salifluor, metal ions (e.g., copper salts, iron salts), sanguinarine, propolis and oxygenating agents (e.g., hydrogen peroxide, buffered sodium peroxyborate or peroxycarbonate), phthalic acid and its salts, monoperthalic acid and its salts and esters, ascorbyl stearate, oleoyl sarcosine, alkyl sulfate, dioctyl sulfosuccinate, salicylanilide, domiphen bromide, delmopinol, octapinol and other piperidino derivatives, nicin preparations, chlorite salts; and mixtures of any of the foregoing.

1.72 Any of the preceding compositions, further comprising an antioxidant, e.g., selected from the group consisting of Co-enzyme Q10, PQQ, Vitamin C, Vitamin E, Vitamin A, BHT, anethole-dithiothione, and mixtures thereof.

1.73 Any of the preceding compositions, further comprising a whitening agent.

1.74 The preceding composition, wherein the whitening agent is selected from the group consisting of peroxides, metal chlorites, perborates, percarbonates, peroxyacids, hypochlorites, and combinations thereof.

1.75 Any of the preceding compositions, further comprising an agent that interferes with or prevents bacterial attachment, e.g. ethyl lauroyl arginiate (ELA) or chitosan.

1.76 Any of the preceding compositions, wherein the oral composition may be any of the following oral compositions selected from the group consisting of: a toothpaste or a dentifrice, a mouthwash or a mouth rinse, a topical oral gel, sprays, powders, strips, floss and a denture cleanser.

1.77 Any of the preceding compositions, wherein the composition is in the form of a cleanser such as a liquid hand soap formulation, body wash, or skin cleanser, or a home care formulation, e.g., a hard surface cleanser such as a dish soap, sunscreen, a makeup remover, or a topical disinfectant.

1.78 A composition obtained or obtainable by combining the ingredients as set forth in any of the preceding compositions.

A composition obtained or obtainable by combining the ingredients as set forth in any of the preceding compositions.

In another embodiment, the invention encompasses a method to improve oral health comprising applying an effective amount of the oral composition of any of the embodiments set forth above to the oral cavity of a subject in need thereof, e.g., a method to i. reduce or inhibit formation of dental caries,
ii. reduce, repair or inhibit early enamel lesions, e.g., as detected by quantitative light-induced fluorescence (QLF) or electrical caries measurement (ECM),
iii. reduce or inhibit demineralization and promote remineralization of the teeth,
iv. reduce hypersensitivity of the teeth,
v. reduce or inhibit gingivitis,
vi. promote healing of sores or cuts in the mouth,
vii. inhibit microbial biofilm formation in the oral cavity,
viii. raise and/or maintain plaque pH at levels of at least pH 5.5 following sugar challenge,
ix. reduce plaque accumulation,
x. treat dry mouth,
xi. enhance systemic health, including cardiovascular health, e.g., by reducing potential for systemic infection via the oral tissues,
xii. whiten teeth,
xiii. reduce erosion of the teeth,
xiv. immunize (or protect) the teeth against cariogenic bacteria and their effects, and/or
xv. clean the teeth and oral cavity.

As used herein, the term "tertiary amine" refers to a compound containing at least one amine in which the nitrogen atom is directly bonded to three carbons of any hybridization, except for carbonyl group carbons. Tertiary amine may be used to refer to compounds containing a plurality of tertiary amine groups (i.e., a tertiary polyamine). In particular, it is envisioned that tertiary amines may or may not be acid addition salts (e.g., hydrochloride salts and hydrofluoride salts). Hydrofluoride derivatives of tertiary amines are referred to as "amine fluorides." In methods for the production or manufacture of a composition containing an amine fluoride, a tertiary amine may be a precursor to forming the amine fluoride.

Basic Amino Acids

The basic amino acids which can be used in the compositions and methods of the invention include not only naturally occurring basic amino acids, such as arginine, but also any basic amino acids having a carboxyl group and an amino group in the molecule, which are water-soluble and provide an aqueous solution with a pH of 7 or greater.

Accordingly, basic amino acids include, but are not limited to, arginine, serine, citrullene, ornithine, creatine, diaminobutanoic acid, diaminoproprionic acid, salts thereof or combinations thereof. In a particular embodiment, the basic amino acids are selected from arginine, citrullene, and ornithine.

In certain embodiments, the basic amino acid is arginine, for example, L-arginine, or a salt thereof.

The compositions of the invention are intended for topical use in the mouth and so salts for use in the present invention should be safe for such use, in the amounts and concentrations provided. Suitable salts include salts known in the art to be pharmaceutically acceptable salts are generally considered to be physiologically acceptable in the amounts and concentrations provided. Physiologically acceptable salts include those derived from pharmaceutically acceptable inorganic or organic acids or bases, for example acid addition salts formed by acids which form a physiological acceptable anion, e.g., hydrochloride or bromide salt, and base addition salts formed by bases which form a physiologically acceptable cation, for example those derived from alkali metals such as potassium and sodium or alkaline earth metals such as calcium and magnesium. Physiologically acceptable salts may be obtained using standard procedures known in the art, for example, by reacting a sufficiently basic compound such as an amine with a suitable acid affording a physiologically acceptable anion.

Fluoride Ion Source

The oral care compositions may further include one or more fluoride ion sources, e.g., soluble fluoride salts. A wide variety of fluoride ion-yielding materials can be employed as sources of soluble fluoride in the present compositions. Examples of suitable fluoride ion-yielding materials are found in U.S. Pat. No. 3,535,421, to Briner et al.; U.S. Pat. No. 4,885,155, to Parran, Jr. et al. and U.S. Pat. No. 3,678,154, to Widder et al., each of which are incorporated herein by reference. Representative fluoride ion sources used with the present invention (e.g., Composition 1.0 et seq.) include, but are not limited to, sodium fluoride, potassium fluoride, sodium monofluorophosphate, sodium fluorosilicate, ammonium fluorosilicate, amine fluoride, ammonium fluoride, and combinations thereof. In certain embodiments the fluoride ion source includes sodium fluoride, sodium monofluorophosphate as well as mixtures thereof. Where the formulation comprises calcium salts, the fluoride salts are preferably salts wherein the fluoride is covalently bound to another atom, e.g., as in sodium monofluorophosphate, rather than merely ionically bound, e.g., as in sodium fluoride.

Surfactants

The invention may in some embodiments contain anionic surfactants, e.g., the Compositions of Composition 1.0, et seq., for example, water-soluble salts of higher fatty acid monoglyceride monosulfates, such as the sodium salt of the monosulfated monoglyceride of hydrogenated coconut oil fatty acids such as sodium N-methyl N-cocoyl taurate, sodium cocomo-glyceride sulfate; higher alkyl sulfates, such as sodium lauryl sulfate; higher alkyl-ether sulfates, e.g., of formula $CH_3(CH_2)_mCH_2(OCH_2CH_2)_nOSO_3X$, wherein m is 6-16, e.g., 10, n is 1-6, e.g., 2, 3 or 4, and X is Na or, for example sodium laureth-2 sulfate $(CH_3(CH_2)_{10}CH_2(OCH_2CH_2)_2OSO_3Na)$; higher alkyl aryl sulfonates such as sodium dodecyl benzene sulfonate (sodium lauryl benzene sulfonate); higher alkyl sulfoacetates, such as sodium lauryl sulfoacetate (dodecyl sodium sulfoacetate), higher fatty acid esters of 1,2 dihydroxy propane sulfonate, sulfocolaurate (N-2-ethyl laurate potassium sulfoacetamide) and sodium lauryl sarcosinate. By "higher alkyl" is meant, e.g., $C_{6-30}$ alkyl. In particular embodiments, the anionic surfactant (where present) is selected from sodium lauryl sulfate and sodium ether lauryl sulfate. When present, the anionic surfactant is present in an amount which is effective, e.g., >0.001% by weight of the formulation, but not at a concentration which would be irritating to the oral tissue, e.g., 1%, and optimal concentrations depend on the particular formulation and the particular surfactant. In one embodiment, the anionic surfactant is present at from 0.03% to 5% by weight, e.g., 1.5%.

In another embodiment, cationic surfactants useful in the present invention can be broadly defined as derivatives of aliphatic quaternary ammonium compounds having one long alkyl chain containing 8 to 18 carbon atoms such as lauryl trimethylammonium chloride, cetyl pyridinium chloride, cetyl trimethylammonium bromide, di-isobutylphenoxyethyldimethylbenzylammonium chloride, coconut alkyltrimethylammonium nitrite, cetyl pyridinium fluoride, and mixtures thereof. Illustrative cationic surfactants are the quaternary ammonium fluorides described in U.S. Pat. No. 3,535,421, to Briner et al., herein incorporated by reference. Certain cationic surfactants can also act as germicides in the compositions.

Illustrative nonionic surfactants of Composition 1.0, et seq., that can be used in the compositions of the invention can be broadly defined as compounds produced by the condensation of alkylene oxide groups (hydrophilic in nature) with an organic hydrophobic compound which may be aliphatic or alkylaromatic in nature. Examples of suitable nonionic surfactants include, but are not limited to, the Pluronics, polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides and mixtures of such materials. In a particular embodiment, the composition of the invention comprises a nonionic surfactant selected from polaxamers (e.g., polaxamer 407), polysorbates (e.g., polysorbate 20), polyoxyl hydrogenated castor oils (e.g., polyoxyl 40 hydrogenated castor oil), betaines (such as cocamidopropylbetaine), and mixtures thereof.

Illustrative amphoteric surfactants of Composition 1.0, et seq., that can be used in the compositions of the invention include betaines (such as cocamidopropylbetaine), derivatives of aliphatic secondary and tertiary amines in which the aliphatic radical can be a straight or branched chain and wherein one of the aliphatic substituents contains about 8-18 carbon atoms and one contains an anionic water-solubilizing group (such as carboxylate, sulfonate, sulfate, phosphate or phosphonate), and mixtures of such materials.

The surfactant or mixtures of compatible surfactants can be present in the compositions of the present invention in 0.1% to 5%, in another embodiment 0.3% to 3% and in another embodiment 0.5% to 2% by weight of the total composition.

Flavoring Agents

The oral care compositions of the invention may also include a flavoring agent. Flavoring agents which are used in the practice of the present invention include, but are not limited to, essential oils and various flavoring aldehydes, esters, alcohols, and similar materials, as well as sweeteners such as sodium saccharin. Examples of the essential oils include oils of spearmint, peppermint, wintergreen, sassafras, clove, sage, eucalyptus, marjoram, cinnamon, lemon, lime, grapefruit, and orange. Also useful are such chemicals as menthol, carvone, and anethole. Certain embodiments employ the oils of peppermint and spearmint.

The flavoring agent is incorporated in the oral composition at a concentration of 0.01 to 1% by weight.

Chelating and Anti-Calculus Agents

The oral care compositions of the invention also may include one or more chelating agents able to complex calcium found in the cell walls of the bacteria. Binding of this calcium weakens the bacterial cell wall and augments bacterial lysis.

Another group of agents suitable for use as chelating or anti-calculus agents in the present invention are the soluble pyrophosphates. The pyrophosphate salts used in the present compositions can be any of the alkali metal pyrophosphate salts. In certain embodiments, salts include tetra alkali metal pyrophosphate, dialkali metal diacid pyrophosphate, trialkali metal monoacid pyrophosphate and mixtures thereof, wherein the alkali metals are sodium or potassium. The salts are useful in both their hydrated and unhydrated forms. An effective amount of pyrophosphate salt useful in the present composition is generally enough to provide least 0.1 wt. % pyrophosphate ions, e.g., 0.1 to 3 wt. 5, e.g., 0.1 to 2 wt. %, e.g., 0.1 to 1 wt. %, e.g., 0.2 to 0.5 wt. %. The pyrophosphates also contribute to preservation of the compositions by lowering water activity.

Polymers

The oral care compositions of the invention also optionally include one or more polymers, such as polyethylene glycols, polyvinyl methyl ether maleic acid copolymers, polysaccharides (e.g., cellulose derivatives, for example carboxymethyl cellulose, or polysaccharide gums, for example xanthan gum or carrageenan gum). Acidic polymers, for example polyacrylate gels, may be provided in the form of their free acids or partially or fully neutralized water-soluble alkali metal (e.g., potassium and sodium) or ammonium salts. Certain embodiments include 1:4 to 4:1 copolymers of maleic anhydride or acid with another polymerizable ethylenically unsaturated monomer, for example, methyl vinyl ether (methoxyethylene) having a molecular weight (M.W.) of about 30,000 to about 1,000,000. These copolymers are available for example as Gantrez AN 139

(M.W. 500,000), AN 1 19 (M.W. 250,000) and S-97 Pharmaceutical Grade (M.W. 70,000), of GAF Chemicals Corporation.

Other operative polymers include those such as the 1:1 copolymers of maleic anhydride with ethyl acrylate, hydroxyethyl methacrylate, N-vinyl-2-pyrollidone, or ethylene, the latter being available for example as Monsanto EMA No. 1 103, M.W. 10,000 and EMA Grade 61, and 1:1 copolymers of acrylic acid with methyl or hydroxyethyl methacrylate, methyl or ethyl acrylate, isobutyl vinyl ether or N-vinyl-2-pyrrolidone.

Suitable generally, are polymerized olefinically or ethylenically unsaturated carboxylic acids containing an activated carbon-to-carbon olefinic double bond and at least one carboxyl group, that is, an acid containing an olefinic double bond which readily functions in polymerization because of its presence in the monomer molecule either in the alpha-beta position with respect to a carboxyl group or as part of a terminal methylene grouping. Illustrative of such acids are acrylic, methacrylic, ethacrylic, alpha-chloroacrylic, crotonic, beta-acryloxy propionic, sorbic, alpha-chlorsorbic, cinnamic, beta-styrylacrylic, muconic, itaconic, citraconic, mesaconic, glutaconic, aconitic, alpha-phenylacrylic, 2-benzyl acrylic, 2-cyclohexylacrylic, angelic, umbellic, fumaric, maleic acids and anhydrides. Other different olefinic monomers copolymerizable with such carboxylic monomers include vinylacetate, vinyl chloride, dimethyl maleate and the like. Copolymers contain sufficient carboxylic salt groups for water-solubility.

A further class of polymeric agents includes a composition containing homopolymers of substituted acrylamides and/or homopolymers of unsaturated sulfonic acids and salts thereof, in particular where polymers are based on unsaturated sulfonic acids selected from acrylamidoalykane sulfonic acids such as 2-acrylamide 2 methylpropane sulfonic acid having a molecular weight of about 1,000 to about 2,000,000, described in U.S. Pat. No. 4,842,847, Jun. 27, 1989 to Zahid, incorporated herein by reference.

Another useful class of polymeric agents includes polyamino acids, particularly those containing proportions of anionic surface-active amino acids such as aspartic acid, glutamic acid and phosphoserine, as disclosed in U.S. Pat. No. 4,866,161 Sikes et al., incorporated herein by reference.

In preparing oral care compositions, it is sometimes necessary to add some thickening material to provide a desirable consistency or to stabilize or enhance the performance of the formulation. In certain embodiments, the thickening agents are carboxyvinyl polymers, carrageenan, xanthan gum, hydroxyethyl cellulose and water-soluble salts of cellulose ethers such as sodium carboxymethyl cellulose and sodium carboxymethyl hydroxyethyl cellulose. Natural gums such as karaya, gum arabic, and gum tragacanth can also be incorporated. Colloidal magnesium aluminum silicate or finely divided silica can be used as component of the thickening composition to further improve the composition's texture. In certain embodiments, thickening agents in an amount of about 0.5% to about 5.0% by weight of the total composition are used.

Abrasives

Natural calcium carbonate is found in rocks such as chalk, limestone, marble and travertine. It is also the principle component of egg shells and the shells of mollusks. The natural calcium carbonate abrasive of the invention is typically a finely ground limestone which may optionally be refined or partially refined to remove impurities. For use in the present invention, the material has an average particle size of less than 10 microns, e.g., 3-7 microns, e.g. about 5.5 microns. For example, a small particle silica may have an average particle size (D50) of 2.5-4.5 microns. Because natural calcium carbonate may contain a high proportion of relatively large particles of not carefully controlled, which may unacceptably increase the abrasivity, preferably no more than 0.01%, preferably no more than 0.004% by weight of particles would not pass through a 325 mesh. The material has strong crystal structure, and is thus much harder and more abrasive than precipitated calcium carbonate. The tap density for the natural calcium carbonate is for example between 1 and 1.5 g/cc, e.g., about 1.2 for example about 1.19 g/cc. There are different polymorphs of natural calcium carbonate, e.g., calcite, aragonite and vaterite, calcite being preferred for purposes of this invention. An example of a commercially available product suitable for use in the present invention includes Vicron® 25-11 FG from GMZ.

Precipitated calcium carbonate is generally made by calcining limestone, to make calcium oxide (lime), which can then be converted back to calcium carbonate by reaction with carbon dioxide in water. Precipitated calcium carbonate has a different crystal structure from natural calcium carbonate. It is generally more friable and more porous, thus having lower abrasivity and higher water absorption. For use in the present invention, the particles are small, e.g., having an average particle size of 1-5 microns, and e.g., no more than 0.1%, preferably no more than 0.05% by weight of particles which would not pass through a 325 mesh. The particles may for example have a D50 of 3-6 microns, for example 3.8=4.9, e.g., about 4.3; a D50 of 1-4 microns, e.g. 2.2-2.6 microns, e.g., about 2.4 microns, and a D10 of 1-2 microns, e.g., 1.2-1.4, e.g. about 1.3 microns. The particles have relatively high water absorption, e.g., at least 25 g/100 g, e.g. 30-70 g/100 g. Examples of commercially available products suitable for use in the present invention include, for example, Carbolag® 15 Plus from Lagos Industria Quimica.

In certain embodiments the invention may comprise additional calcium-containing abrasives, for example calcium phosphate abrasive, e.g., tricalcium phosphate ($Ca_3(PO_4)_2$), hydroxyapatite ($Ca_{10}(PO_4)_6(OH)_2$), or dicalcium phosphate dihydrate ($CaHPO_4 2H_2O$, also sometimes referred to herein as DiCal) or calcium pyrophosphate, and/or silica abrasives, sodium metaphosphate, potassium metaphosphate, aluminum silicate, calcined alumina, bentonite or other siliceous materials, or combinations thereof. Any silica suitable for oral care compositions may be used, such as precipitated silicas or silica gels. For example, synthetic amorphous silica. Silica may also be available as a thickening agent, e.g., particle silica. For example, the silica can also be small particle silica (e.g., Sorbosil AC43 from PQ Corporation, Warrington, United Kingdom). However, the additional abrasives are preferably not present in a type or amount so as to increase the RDA of the dentifrice to levels which could damage sensitive teeth, e.g., greater than 130.

Water

Water is present in the oral compositions of the invention. Water, employed in the preparation of commercial oral compositions should be deionized and free of organic impurities. Water commonly makes up the balance of the compositions and includes 5% to 45%, e.g., 10% to 20%, e.g., 25-35%, by weight of the oral compositions. This amount of water includes the free water which is added plus that amount which is introduced with other materials such as with sorbitol or silica or any components of the invention. The Karl Fischer method is a one measure of calculating free water.

Humectants

Within certain embodiments of the oral compositions, it is also desirable to incorporate a humectant to reduce evaporation and also contribute towards preservation by lowering water activity. Certain humectants can also impart desirable sweetness or flavor to the compositions. The humectant, on a pure humectant basis, generally includes 15% to 70% in one embodiment or 30% to 65% in another embodiment by weight of the composition.

Suitable humectants include edible polyhydric alcohols such as glycerin, sorbitol, xylitol, propylene glycol as well as other polyols and mixtures of these humectants. Mixtures of glycerin and sorbitol may be used in certain embodiments as the humectant component of the compositions herein.

pH Adjusting Agents

In some embodiments, the compositions of the present disclosure contain a buffering agent. Examples of buffering agents include anhydrous carbonates such as sodium carbonate, sesquicarbonates, bicarbonates such as sodium bicarbonate, silicates, bisulfates, phosphates (e.g., monopotassium phosphate, dipotassium phosphate, tribasic sodium phosphate, sodium tripolyphosphate, phosphoric acid), citrates (e.g. citric acid, trisodium citrate dehydrate), pyrophosphates (sodium and potassium salts) and combinations thereof. The amount of buffering agent is sufficient to provide a pH of about 5 to about 9, preferable about 6 to about 8, and more preferable about 7, when the composition is dissolved in water, a mouth rinse base, or a toothpaste base. Typical amounts of buffering agent are about 5% to about 35%, in one embodiment about 10% to about 30%, in another embodiment about 15% to about 25%, by weight of the total composition.

The present invention in its method aspect involves applying to the oral cavity a safe and effective amount of the compositions described herein.

The compositions and methods according to the invention (e.g., Composition 1.0 et seq) can be incorporated into oral compositions for the care of the mouth and teeth such as toothpastes, transparent pastes, gels, mouth rinses, sprays and chewing gum.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. It is understood that when formulations are described, they may be described in terms of their ingredients, as is common in the art, notwithstanding that these ingredients may react with one another in the actual formulation as it is made, stored and used, and such products are intended to be covered by the formulations described.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

Methods of the Present Disclosure

In a further aspect, the invention is a method [Method 1], of manufacturing an oral care or personal care composition, which includes the steps of mixing a tertiary amine (e.g., amine fluoride) in water; and increasing the solubility of the tertiary amine via the addition of an effective amount of an alkali salt. For example, the invention contemplates any of the following compositions (unless otherwise indicated, values are given as percentage of the overall weight of the composition):

1.1 Method 1, wherein the step of mixing a tertiary amine in water further includes mixing an acid (e.g., an organic acid and/or an inorganic acid).

1.2 The preceding method, wherein the acid is lactic acid, citric acid, tartaric acid, fumaric acid, malic acid or hydrochloric acid.

1.3 The preceding method, wherein the acid is hydrochloric acid.

1.4 Any of the preceding methods, wherein the step of mixing a tertiary amine in water further includes mixing a fluoride source.

1.5 Any of the preceding methods, wherein the solubility of the tertiary amine is increased by at least 25%.

1.6 Any of the preceding methods, wherein the solubility of the tertiary amine is increased by at least 30%.

1.7 Any of the preceding methods, wherein the solubility of the tertiary amine is increased by at least 40%.

1.8 Any of the preceding methods, wherein the solubility of the tertiary amine is increased by at least 50%.

1.9 Any of the preceding methods, wherein the solubility of the tertiary amine is increased by at least 60%.

1.10 Any of the preceding methods, wherein the solubility of the tertiary amine is increased by at least 70%.

1.11 Any of the preceding methods, wherein the solubility of the tertiary amine is increased by at least 80%.

1.12 Composition 1, wherein the tertiary amine comprises a tertiary polyamine or an amine fluoride.

1.13 Any of the preceding compositions, wherein the tertiary amine comprises one or more of N'-octadecyltrimethylendiamine-N,N,N'-tris(2-ethanol), N'-octadecyltrimethylendiamine-N,N,N'-tris(2-ethanol)-dihydrofluoride (olaflur),N-octadeca-9-enylamine hydrofluoride (dectaflur), and/or N-octadeca-9-enylamine.

1.14 Any of the preceding compositions, wherein the tertiary amine is a tertiary polyamine.

1.15 Any of the preceding compositions, wherein the tertiary amine comprises at least one of N'-octadecyltrimethylendiamine-N,N,N'-tris(2-ethanol) and N-octadeca-9-enylamine.

1.16 Any of the preceding compositions, wherein the tertiary amine comprises or consists of N'-octadecyltrimethylendiamine-N,N,N'-tris(2-ethanol).

1.17 Any of the preceding compositions, wherein the tertiary amine comprises an amine fluoride (e.g., octadecyltrimethylendiamine-N,N,N'-tris(2-ethanol)-dihydrofluoride, N-octadeca-9-enylamine hydrofluoride).

1.18 Any of the preceding methods, wherein the tertiary amine is present in the resulting mixture in an amount of about 10 wt. % to about 80 wt. %, based on the total weight of the composition.

1.19 Any of the preceding methods, wherein the tertiary amine is present in the resulting mixture in an amount of about 20 wt. % to about 70 wt. %, based on the total weight of the composition.

1.20 Any of the preceding methods, wherein the tertiary amine is present in the resulting mixture in an amount of about 20 wt. % to about 40 wt. %, based on the total weight of the composition.

1.21 Any of the preceding methods, wherein the tertiary amine is present in the resulting mixture in an amount of about 25 wt. % to about 35 wt. %, based on the total weight of the composition.
1.22 Any of the preceding methods, wherein the alkali salt is an alkali halide or an alkali salt of an organic acid.
1.23 Any of the preceding methods, wherein the alkali salt is an alkali halide.
1.24 Any of the preceding methods, wherein the alkali salt is a sodium or potassium halide.
1.25 Any of the preceding methods, wherein the alkali salt is sodium chloride or potassium chloride.
1.26 Any of the preceding methods, wherein the alkali salt is sodium chloride.
1.27 Any of the preceding methods, wherein the alkali salt is an alkali salt of an organic acid.
1.28 Any of the preceding methods, wherein the alkali salt is trisodium citrate.
1.29 Any of the preceding methods, wherein the alkali salt is trisodium citrate dihydrate.
1.30 Any of the preceding methods, wherein the alkali salt is present in the resulting mixture in an amount of about 0.01 wt. % to about 15 wt. %, based on the total weight of the composition.
1.31 Any of the preceding methods, wherein the alkali salt is present in the resulting mixture in an amount of about 0.05 wt. % to about 5 wt. %, based on the total weight of the composition.
1.32 Any of the preceding methods, wherein the alkali salt is present in the resulting mixture in an amount of about 1 wt. % to about 2.5 wt. %, based on the total weight of the composition.
1.33 Any of the preceding methods, wherein the alkali salt comprises or consists of sodium chloride present in an amount of about 1.0 wt. % to about 2.0 wt. %, based on the total weight of the composition.
1.34 Any of the preceding methods, wherein the alkali salt comprises or consists of potassium chloride present in an amount of about 1.0 wt. % to about 2.5 wt. %, .e.g., about 1.0 wt. % to about 2.0 wt. %, based on the total weight of the composition.
1.35 Any of the preceding methods, wherein the alkali salt comprises or consists of trisodium citrate dihydride present in an amount of about 1.0 wt. % to about 4.0 wt. %, e.g., about 1.0 wt. % to about 3.5 wt. %, based on the total weight of the composition.
1.36 Any of the preceding methods, wherein the composition is an aqueous solution.
1.37 Any of the preceding methods, wherein the composition is an oral care composition.
1.38 Any of the preceding methods, wherein the composition is in the form of a mouthwash or dentifrice.

In a further aspect, the present disclosure is directed to compositions (e.g., Composition 1 or Compositions 1.1, et seq.) that are obtained or obtainable by the methods as set forth above (e.g., Method 1 or Methods 1.1, et seq.)

EXAMPLES

Example 1—Effect of Alkali Salts on the Solubility of Amine Fluoride in Solution Test solutions are created containing amine fluoride (N'-octadecyltrimethylendiamine-N,N,N'-tris(2-ethanol)-dihydrofluoride) and water. Amine fluoride is added in increasingly greater amounts to determine its saturation concentration, shown below in Table 1A. All values reported in the tables below are in weight percentages.

TABLE 1A

Dissolution characteristics of Amine Fluoride in water without additional inorganic salts

| Formulation | Amine Fluoride | Water | Solubility observation |
| --- | --- | --- | --- |
| Composition 1 | 20.4 | q.s. | Clear yellow solution |
| Composition 2 | 22.9 | q.s. | Clear yellow solution |
| Composition 3 | 24.4 | q.s. | Clear yellow solution at the edge of solubility |
| Composition 4 | 25.9 | q.s. | Clear yellow solution with some undissolved amine fluoride |
| Composition 5 | 31.8 | q.s | Clear yellow semi solid mass |

Thus, the maximum solubility of amine fluoride in water is established to be approximately 24% by weight, which corresponds to a concentration of about 440 mM tertiary amine once the amine fluoride is fully dissociated from hydrofluoride.

Similar formulations are created also containing one or more alkali salts, selected from sodium chloride, potassium chloride and trisodium citrate dihydrate to investigate the effect of the salts' presence on solubility of the amine fluoride. The results are summarized in Table 1B below.

TABLE 1B

Dissolution characteristics of Amine Fluoride in water with addition of alkali salts

| Formulation | Amine Fluoride | Sodium Chloride | Potassium Chloride | Trisodium Citrate Dihydrate | Water | Solubility observation |
| --- | --- | --- | --- | --- | --- | --- |
| Composition 6 | 26.1 | 0.7 | — | — | q.s. | Clear yellowish solution |
| Composition 7 | 31.8 | 1.2 | — | — | q.s. | Clear yellowish solution |
| Composition 8 | 36.2 | 2.5 | — | — | q.s. | Slightly turbid yellow solution with minimal sediment |
| Composition 9 | 40.5 | 1.0 | — | — | q.s. | Clear yellowish solution with some undissolved amine fluoride |

TABLE 1B-continued

Dissolution characteristics of Amine Fluoride in water with addition of alkali salts

| Formulation | Amine Fluoride | Sodium Chloride | Potassium Chloride | Trisodium Citrate Dihydrate | Water | Solubility observation |
|---|---|---|---|---|---|---|
| Composition 10 | 35.6 | 1.7 | — | — | q.s. | Clear yellowish solution at the boundary of solubility |
| Composition 11 | 32.9 | 1.6 | — | — | q.s. | Clear yellowish solution |
| Composition 12 | 32.9 | 0.5 | — | — | q.s. | Clear yellowish solution with some undissolved amine fluoride |
| Composition 13 | 32.9 | — | 1.6 | — | q.s. | Clear yellowish solution (dissolved slowly) |
| Composition 14 | 32.9 | — | 2.0 | — | q.s. | Clear yellowish solution |
| Composition 15 | 32.9 | 1.0 | — | 1.5 | q.s. | Clear yellowish solution |
| Composition 16 | 32.9 | — | — | 2.5 | | Clear yellowish solution |

Addition of alkali salts were shown to increase the solubility of amine fluoride in water to slightly above 35% by weight (i.e., corresponding to a concentration of about 640 mM tertiary amine) when adding sodium chloride, as demonstrated with composition 10. Concentrations of sodium chloride as low as about 0.7% were shown to increase solubility of amine fluoride in water. Similar effects were observed with potassium chloride as well as trisodium citrate. On the other hand, a concentration of sodium chloride of 2.5% did not increase solubility of amine fluoride, as established in composition 8, which resulted in incomplete dissolution of recipe ingredients.

Example 2—Effect of Alkali Salts on the Solubility of a Tertiary Amine in Solution Similar compositions were created as those listed in Table 1A, but instead of amine fluoride, a tertiary amine was used. Without adjustment of pH, the solubility of the tertiary amine in water was shown to be about 70% by weight (about 1520 mM tertiary amine). However, when adding hydrochloric acid to the solution (compositions 21-23) in concentrations calculated to correspond with the level of hydronium ions present in an equivalent amount of amine fluoride, then the solubility of tertiary amine is slightly above 24% corresponding to a concentration of about 530 mM. Results are summarized below in Table 2A.

TABLE 2A

Dissolution characteristics of Tertiary Amine without addition of inorganic salts

| Formulation | Tertiary Amine | HCl (32% solution) | Water | Solubility Observation |
|---|---|---|---|---|
| Composition 17 | 40.0 | — | q.s. | Clear yellow viscous solution |
| Composition 18 | 50.0 | — | q.s. | Clear yellow flowable gel |
| Composition 19 | 60.0 | — | q.s. | Clear yellow thick flowable gel |
| Composition 20 | 70.0 | — | q.s. | Clear yellow thick gel |
| Composition 21 | 22.1 | 10.8 | q.s. | Clear yellow solution |
| Composition 22 | 24.5 | 12.0 | q.s. | Clear yellow solution at the edge of solubility |
| Composition 23 | 28.1 | 13.8 | q.s | Clear yellow undissolvable solid |

Further compositions containing the tertiary amine and hydrochloric acid were created. To these solutions, various quantities of alkali salts were added to evaluate the effect on solubility of the tertiary amine. Results are summarized in Table 2B below

TABLE 2B

Dissolution characteristics of Tertiary Amine with addition of inorganic salts

| Formulation | Tertiary Amine | HCl (32% solution) | Sodium Chloride | Potassium Chloride | Trisodium Citrate Dihydrate | Water | Solubility observation |
|---|---|---|---|---|---|---|---|
| Composition 24 | 34.3 | 16.8 | 0.5 | — | — | q.s. | Clear yellow semi-solid mass |
| Composition 25 | 34.3 | 16.8 | 1.0 | — | — | q.s. | Clear yellowish solution |

TABLE 2B-continued

Dissolution characteristics of Tertiary Amine with addition of inorganic salts

| Formulation | Tertiary Amine | HCl (32% solution) | Sodium Chloride | Potassium Chloride | Trisodium Citrate Dihydrate | Water | Solubility observation |
|---|---|---|---|---|---|---|---|
| Composition 26 | 34.3 | 16.8 | 1.9 | — | — | q.s. | Clear yellowish solution |
| Composition 27 | 34.3 | 16.8 | 2.5 | — | — | q.s. | Clear yellowish solution |
| Composition 28 | 34.3 | 16.8 | 5.0 | — | — | q.s. | Clear yellowish solution |
| Composition 29 | 34.3 | 16.8 | 7.5 | — | — | q.s. | Clear yellowish viscous solution |
| Composition 30 | 34.3 | 16.8 | 10.0 | — | — | q.s. | Clear yellowish viscous solution |
| Composition 31 | 34.3 | 16.8 | — | 2.5 | — | q.s. | Clear yellowish solution |
| Composition 32 | 34.3 | 16.8 | — | — | 3.0 | q.s. | Clear yellowish solution |
| Composition 33 | 36.8 | 18.9 | 2.5 | — | — | q.s. | Clear yellowish viscous solution at the edge of solubility |
| Composition 34 | 41.8 | 19.6 | 5.0 | — | — | | Clear yellowish viscous solution |

When adding hydrochloric acid to a tertiary amine solution in concentrations calculated to correspond with the level of hydronium ions present in an equivalent amount of amine fluoride and additionally adding an alkali salt, the solubility of tertiary amine in water is around increased to about 40% by weight (about 870 mM tertiary amine), which required addition of about 5% alkali salt to fully dissolve the tertiary amine (composition 34). The minimum addition of Sodium Chloride to fully dissolve 34% of tertiary amine was about 1%.

A new batch of solutions was created similar to those shown in Table 2B, but with the addition of sodium fluoride.

TABLE 2C

Dissolution characteristics of Tertiary Amine without and with addition of inorganic salts and sodium fluoride

| Formulation | Tertiary Amine | HCl (32% solution) | Sodium Chloride | Sodium Fluoride | Water | Solubility observation |
|---|---|---|---|---|---|---|
| Composition 35 | 17.2 | 8.4 | — | 3.1 | q.s. | Clear yellowish solution |
| Composition 36 | 19.6 | 9.6 | — | 3.5 | q.s. | Yellow turbid solution with sediment |
| Composition 37 | 22.1 | 10.8 | 1.0 | 4.0 | q.s. | Yellow turbid solution with sediment |
| Composition 38 | 34.3 | 16.8 | 1.0 | 6.2 | q.s | Yellow semi-solid undissolvable mass |

When adding hydrochloric acid and sodium fluoride to a solution containing a tertiary amine in concentrations calculated to correspond with the level of hydronium and fluoride ions present in an equivalent amount of amine fluoride, as well as additionally adding an alkali salt, the solubility of the tertiary amine was not increased any further compared to the solubility of the tertiary amine in absence of additional inorganic salts (composition 24). Without being bound by theory, this is likely due to the fact that hydrochloric acid and sodium fluoride contribute to a high load of additional ions in the solution preventing dissolution of additional tertiary amine.

While the present invention has been described with reference to embodiments, it will be understood by those skilled in the art that various modifications and variations may be made therein without departing from the scope of the present invention as defined by the appended claims.

The invention claimed is:

1. A method of manufacturing an oral care or personal care composition, the method comprising the steps of:
   a. mixing a tertiary amine in water to form an aqueous solution, the tertiary amine comprising one or more of N'-octadecyltrimethylendiamine-N,N,N'-tris(2-ethanol), N'-octadecyltrimethylendiamine-N,N,N'-tris(2-ethanol)-dihydrofluoride, N-octadeca-9-enylamine hydrofluoride, or N-octadeca-9-enylamine; and
   b. increasing the solubility of the tertiary amine in the aqueous solution via the addition of about 1 to about 2.5 wt. % of an alkali salt selected from sodium chloride, potassium chloride, trisodium citrate dihydrate, and a combination of two or more thereof, wherein the aqueous solution after the step of increasing the solubility of the tertiary amine consists of the tertiary amine, the alkali salt, the water, and optionally an acid.

2. The method according to claim 1, wherein the step of mixing a tertiary amine in water further includes mixing an acid.

3. The method according to claim 2, wherein the acid is lactic acid, citric acid, tartaric acid, fumaric acid, malic acid or hydrochloric acid.

4. The method according to claim 3, wherein the acid is hydrochloric acid.

5. The method according to claim 1, wherein the step of mixing a tertiary amine in water further includes mixing a fluoride source.

6. The method according to claim 1, wherein the solubility of the tertiary amine is increased by at least 25%.

7. The method according to claim 1, wherein the solubility of the tertiary amine is increased by at least 40%.

8. The method according to claim 1, wherein the solubility of the tertiary amine is increased by at least 70%.

9. The method according to claim 1, wherein the tertiary amine comprises one or more of N'-octadecyltrimethylendiamine-N,N,N'-tris(2-ethanol)-dihydrofluoride or N-octadeca-9-enylamine hydrofluoride.

10. The method according to claim 1, wherein the tertiary amine comprises N'-octadecyltrimethylendiamine-N,N,N'-tris(2-ethanol) or N-octadeca-9-enylamine.

11. The method according to claim 1, wherein the tertiary amine is present in the aqueous solution in an amount of about 10 wt. % to about 80 wt. %, based on the total weight of the composition.

12. The method according to claim 1, wherein the alkali salt is sodium chloride, potassium chloride or trisodium citrate dihydrate.

13. The method according to claim 1, wherein the alkali salt is present in the aqueous solution in an amount of about 1.0 wt. % to about 2.0 wt. %, based on the total weight of the composition.

14. The method of claim 1, wherein the alkali salt is sodium chloride.

15. A method of manufacturing a composition, the method comprising:
   a. forming an aqueous solution by mixing a tertiary amine in water, the tertiary amine comprising one or more of N'-octadecyltrimethylendiamine-N,N,N'-tris(2-ethanol), N'-octadecyltrimethylendiamine-N,N,N'-tris(2-ethanol)-dihydrofluoride, N-octadeca-9-enylamine hydrofluoride, or N-octadeca-9-enylamine; and
   b. increasing the solubility of the tertiary amine in the aqueous solution to at least 35% by weight via the addition of about 1 to about 2 wt. % of an alkali salt selected from sodium chloride, potassium chloride, trisodium citrate dihydrate, and a combination of two or more thereof, wherein the aqueous solution consists of the tertiary amine, the alkali salt, water, and optionally an acid.

16. A method of manufacturing a stock composition for use in a personal care or oral care composition, the method consisting of:
   a. mixing a tertiary amine in water, the tertiary amine comprising one or more of N'-octadecyltrimethylendiamine-N,N,N'-tris(2-ethanol), N'-octadecyltrimethylendiamine-N,N,N'-tris(2-ethanol)-dihydrofluoride, N-octadeca-9-enylamine hydrofluoride, or N-octadeca-9-enylamine; and
   b. increasing the solubility of the tertiary amine to at least 35% by weight via the addition of about 1 to about 2 wt. % of an alkali salt selected from sodium chloride, potassium chloride, trisodium citrate dihydrate, and a combination of two or more thereof to form a stock composition, wherein the stock composition consists of the tertiary amine, the alkali salt, water, and optionally an acid.

17. The method of claim 1, wherein the alkali salt is potassium chloride.

18. The method of claim 1, wherein the alkali salt is trisodium citrate dihydrate.

* * * * *